United States Patent [19]

Gregory

[11] 4,437,220

[45] Mar. 20, 1984

[54] METHOD AND APPARATUS FOR DISMOUNTING TRUNNION BEARINGS

[76] Inventor: Oran A. Gregory, 5334 N. Henry Blvd., Stockbridge, Ga. 30281

[21] Appl. No.: 399,708

[22] Filed: Jul. 19, 1982

[51] Int. Cl.³ .............................................. B23P 19/00

[52] U.S. Cl. .............................. 29/426.5; 29/148.4 R; 29/251; 29/256; 403/16

[58] Field of Search ................. 29/256, 258, 259, 260, 29/263, 264, 266, 282, 251, 148.4 R, 426.5, 271, 242; 403/16; 100/295, 266; 72/454

[56] References Cited

U.S. PATENT DOCUMENTS

| | | | |
|---|---|---|---|
| 3,005,324 | 10/1961 | Zeller | 29/256 X |
| 3,060,558 | 10/1962 | Levenson | 29/256 |
| 3,060,559 | 10/1962 | Levenson | 29/256 |
| 3,786,544 | 4/1974 | Ferguson | 29/256 X |
| 4,343,075 | 8/1982 | Guptill et al. | 29/258 X |

FOREIGN PATENT DOCUMENTS 476140 5/1929 Fed. Rep. of Germany ........ 29/266

*Primary Examiner*—Carl E. Hall
*Assistant Examiner*—John Burtch
*Attorney, Agent, or Firm*—Thomas & Kennedy

[57] ABSTRACT

A method and apparatus for dismounting a trunnion bearing from a universal joint utilizes a plate that is secured to the proximal arm of one yoke of the joint through which dismounting bolts are threaded into contact with the other joint yoke. Further threading of the dismounting bolts into the plate causes the one yoke secured to the plate to move along a pin of a crossed-pin member of the universal joint, bringing a pin end into contact with the trunnion bearing in the distal arm of the one yoke, thereby urging it out from its press-fitted position in that arm.

5 Claims, 3 Drawing Figures

METHOD AND APPARATUS FOR DISMOUNTING TRUNNION BEARINGS

TECHNICAL FIELD

This invention relates to methods and apparatuses for dismounting trunnion bearings from univeral joints.

BACKGROUND OF THE INVENTION

Universal joints, such as the yoke and spider type, typically have two forked coupling halves or yokes which are pivotably mounted to a crossed-pin member or spider for rotation about two axes oriented at right angles to each other. Each arm of each yoke is pivotably mounted to an end of the crossed-pin member by trunnion bearings that have a generally cup-shaped outer race press-fitted within a recess of the yoke arm about the pin end, with a set of needle or roller bearings arranged annularly about the pin end within the race. In order to service the joint, or replace or repair a bearing, it is necessary to remove it from its press-fitted placement within the yoke arms. Heretofore, this has typically been done by unthreading the bolts from both trunnion bearings mounted to the arms of one yoke and then striking that yoke as with a sledgehammer to move it axially along one pin of the crossed-pin member. As this is done the cup-shaped outer race of the bearing is brought into engagement with an end of the pin whereby further movement of the yoke causes that pin end to push the bearing outer race out of its press-fitted location within the yoke arm.

The just-described procedure has had pronounced disadvantages and limitations. For example, the use of a sledgehammer is often limited by spacial restrictions about the universal joint. For instance, with automobiles and trucks its location is often difficult to access and spacially restricted which limits hammer travel distance and direction. The striking of a joint yoke also tends to place a torque upon the crossed-pin member or spider which can itself damage one or both of the trunnion bearings or a bearing seal.

Heretofore, apparatuses or tools have been devised to aid in the removal of trunnion bearings from universal joints. These devices, however, often have been designed merely to insure that the force of a sledgehammer is imparted substantially coaxially with respect to one of the pins of the universal joint's crossed-pin member. Furthermore, the devices have typically been of a configuration such as to require their being mounted completely about a universal joint. For example, U.S. Pat. No. 4,120,082 disclosed a universal drive shaft service kit of such a type which is mounted about opposite sides of a joint and which has an impact knob for communicating a shock force resulting from the impact of a hammer onto a trunnion bearing. Again, spacial restrictions often found to be present within the environs of a universal joint render the use of such devices impractical and cumbersome.

It therefore would be advantageous to devise an apparatus and method for removing trunnion bearings from universal joints in a manner that would overcome these disadvantages and limitations of the prior art. It is this task to which the present invention is primarily directed.

SUMMARY OF THE INVENTION

In one preferred form of the invention a method is provided for dismounting a trunnion bearing from a universal joint of the type having a crossed-pin member or spider to each pin of which a yoke is mounted for pivotal movement by means of trunnion bearings having outer races press-fitted and bolted to the arms of each yoke overlaying the pin ends. The method comprises the steps of unbolting the trunnion bearing races from the arms of one yoke, bolting to a proximal arm of the one yoke a plate so as to position threaded holes in the plate in alignment with the arms of the other yoke, threading dismounting bolts into the plate threaded holes and into contact with the other yoke arms, and continuing to thread the dismounting bolts into the plate threaded holes thereby forcing the plate and the one yoke secured thereto to slide upon a pin until an end of that pin has engaged and urged the trunnion bearing race in the one yoke arm distal the plate at least partially therefrom.

In another preferred form of the invention, apparatus is provided for dismounting a trunnion bearing from a universal joint of the type having a crossed-pin member or spider, to each pin of which member a yoke is mounted for pivotal movement by means of trunnion bearings having outer races secured to the arms of each yoke overlaying the ends of the pins, and with each yoke arm having a pair of threaded holes straddling a pin of the crossed-pin member in which bolts may be threaded in securing the trunnion bearing race thereto. The apparatus comprises a plate adapted to be placed against a proximal trunnion bearing of one yoke with an inner pair of plate holes sized and located for bolts to be passed therethrough and threaded into the pair of threaded holes of the proximal arm of the one yoke and with a pair of outer threaded plate holes located so as to be aligned with the arms of the other yoke. The apparatus further comprises a pair of threaded dismounting bolts of a length more than sufficient to be threaded into the plate outer threaded holes, with the plate placed against the proximal trunnion bearing, and into engagement with the other yoke arms. So constructed, the apparatus need only be mounted to one side of a universal joint in dismounting a trunnion bearing from the other joint side by threading the dismounting bolts into the plate against the other yoke arms until the trunnion bearing on the one yoke arm distal the plate has been urged at least partially therefrom.

DETAILED DESCRIPTION

Figure 1:
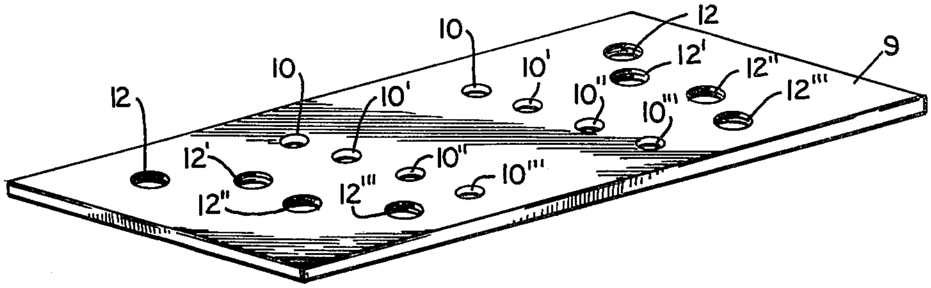
FIG. 1 is a perspective view of the plate element of apparatus embodying principles of the present invention which may be used in practicing a method of the invention.

With reference next to the drawing, there is shown a universal joint of the type having a crossed-pin member or spider 15 from which pins 16 and 17 coaxially extend and from which pins 18 and 19 coaxially extend at right angles to the pins 16 and 17. For clarity, coaxial pins 16 and 17 are considered as separate pins, as are coaxial pins 18 and 19. However, elsewhere in this specification and in the claims pins 16/17 and 18/19 are considered as single pins of the crossed-pin member.

A generally U-shaped yoke 20 is pivotably mounted to the pins 18 and 19 while another U-shaped yoke 22 is pivotably mounted to the pins 16 and 17. The yoke 20 has an opening 21 to which a shaft may be connected while the yoke 22 has an opening 23 to which another shaft may be connected, as by a weld formed between the shafts and the openings 21 and 23. As is well known, once shafts have been so mounted to the two yokes, the universal joint serves as a coupling for transmitting force between the two shafts even though they may be rotatably driven about axes that are offset from each other. It thus should be understood that while the universal joint, as illustrated in FIGS. 2 and 3 has been described as being shown in a side-elevational view, these views could just as easily be considered plan or bottom views since the yokes may be mounted at many different orientations both relative to each other and with respect to the joint environment.

Each of the U-shaped yokes 20 and 22 has a pair of yoke arms, with those of yokes 22 being shown at 25. Each yoke arm is pivotably mounted to one of the pins of the crossed-pin member 15 by a trunnion bearing 30 that has a hollow cylindrical outer race 32 closed at one end by an end plate 33 having flanges 34 which are provided with holes through which bearing mounting screws 35 may be passed in mounting the trunnion bearing to a yoke arm. A set of roller or needle bearings 37 is located in annular arrangement within the trunnion bearing race about one of the pins of the cross-pin member. Each trunnion bearing may also have an annular seal to inhibit lubricant in the bearing from escaping inwardly into the yoke. Thus described, the universal joint is of conventional construction such as those joints found today in large trucks.

To dismount a trunnion bearing from an arm 25 of the yoke 22, the four bolts 35 which secure the bearing to the two arms of that yoke are first removed. As shown in FIG. 2., the plate 9 is then placed against the trunnion bearing located on the opposite arm of yoke 22 to that arm from which a bearing is to be dismounted. In this position a pair of plate inner holes 10, 10', 10'' or 10''' are located in register with the holes in the trunnion bearing race flanges 34. Which particular pair of plate inner holes will be placed in register will, of course, depend on the size of the particular universal joint being serviced. Bolts 35 are then threaded into the plate inner holes and back into one of the yoke arms.

Figure 2:
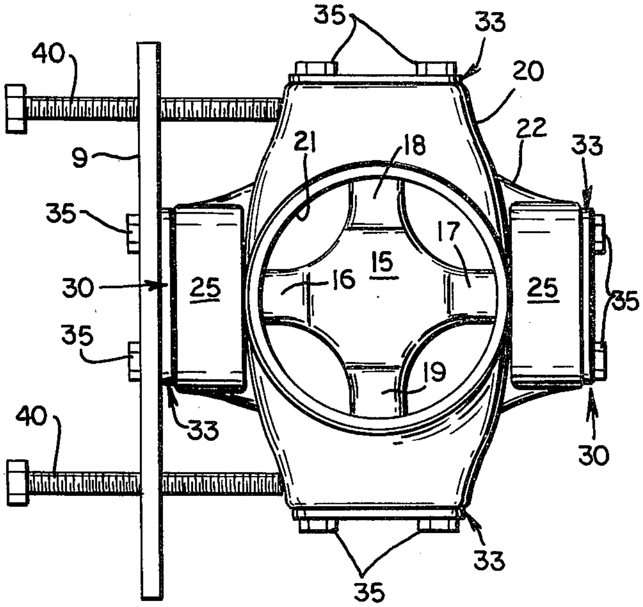
FIG. 2 is a side-elevational view of a universal joint to which the apparatus of the present invention is secured in preparation for dismounting a trunnion bearing from the joint.
Figure 3:
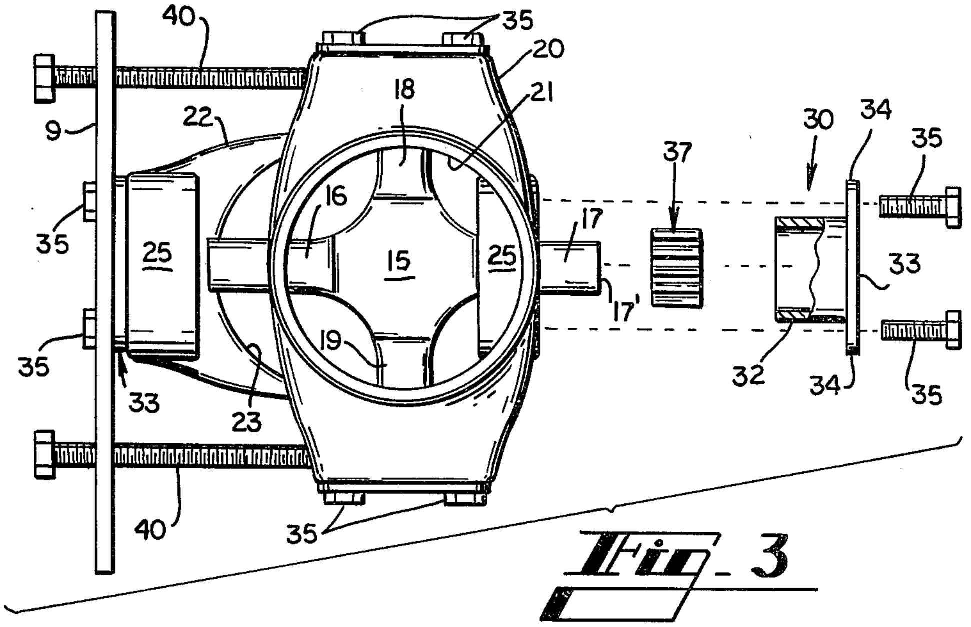
FIG. 3 is another side-elevational view of the universal joint shown in FIG. 2 after the apparatus has been used in dismounting one of the trunnion bearings as shown in an exploded form.

Next, two dismounting bolts 40 are threaded into a pair of the plate outer threaded holes 12, 12' 12'' or 12''' and into contact with yoke 20, still as shown in FIG. 2. It should be noted at this point that the apparatus has been mounted to but one side of the universal joint, namely that side opposite from the trunnion bearing to be dismounted, with no part of the apparatus located about the other yoke 20.

Next, the screws 40 are together threaded further into the plate 9 causing the plate to pull yoke 22 to the left as shown in FIG. 3 upon the coaxial pins 16 and 17 of the crossed-pin member 15. This occurs since the other yoke 20, that is in contact with the ends of the screws 40, cannot move on coaxial pins 18 and 19 since the force being applied to that yoke is at right angles to the pins upon which it pivots. As screws 40 are continued to be threaded into the plate end 17' of pin 17 contacts the plate element 33 of the trunnion bearing 30 mounted to pin 17 causing it to urge the trunnion bearing out from its press-fitted location or seat within yoke 22. At this point the flanges 34 of the trunnion bearing may be gripped as with a wrench and pulled out. Alternatively, the dismounting bolts 40 may be further threaded into the plate until the bearing 30 has been freed completely from the yoke. At this point the needle or roller bearings 37 will also come free.

If it is desired to dismount the other trunnion bearing on pin 16 the plate 9 and dismounting bolts 40 may be removed from the position illustrated in the drawing and remounted flush against the pin end 17 as with bolts somewhat longer than bolts 35 threaded to the other arm of yoke 22. The dismounting bolts 40 are threaded into the plate 9 up against the yoke 20 until the trunnion bearing about pin 16 has been dismounted from the other yoke arm 25. Following this, the bearings mounted within the other yoke 20 may also be dismounted in a similar manner.

It thus is seen that a method and apparatus is provided for dismounting trunnion bearings from a universal joint with relative ease in restricted space and without the use of a sledgehammer or the like. The provision of several sets of plate hole pairs enables the same plate member to be used in dismounting trunnion bearings from universal joints of several different sizes. One particularly advantageous use is in dismounting bearings from universal joints from under the fifth wheel of large trucks where there is very little room in which to maneuver and to swing a sledgehammer.

Finally, it should be understood that the just-described embodiment merely illustrates principles of the invention in a preferred form. Many modifications, additions and deletions may, of course, be made thereto without departure from the spirit and scope of the invention as set forth in the following claims.

I claim:

1. A method of dismounting a trunnion bearing from a universal joint of the type having a crossed-pin member or spider to each pin of which a yoke is mounted for pivotal movement by means of trunnion bearings having outer races press-fitted and bolted to the arms of each yoke overlaying the pin ends, and with the method comprising the steps of unbolting the trunnion bearing races from the arms of one yoke; bolting to a proximal arm of the one yoke a plate so as to position threaded holes in the plate in alignment with the arms of the other yoke; threading dismounting bolts into the plate threaded holes and into contact with the other yoke arms; and continuing to thread the dismounting bolts into the plate threaded holes thereby forcing the plate and one yoke secured thereto to slide upon a pin of the crossed-pin member until an end of the pin has engaged and urged the trunnion bearing race in the one yoke arm distal the plate at least partially from the yoke arm.

2. The trunnion bearing dismounting method of claim 1 wherein the dismounting bolts are threaded in a direction substantially parallel to the pin to which the one yoke is mounted.

3. Apparatus for dismounting a trunnion bearing from a universal joint of the type having a crossed-pin member or spider to each pin of which member a yoke is mounted for pivotal movement by means of trunnion bearings having outer races secured to the arms of each yoke overlaying the ends of the pins and with each yoke arm having a pair of threaded holes straddling a pin of the crossed-pin member in which bolts may be threaded in securing the trunnion bearing race thereto, and with the apparatus comprising, in combination, a plate to be placed against a proximal trunnion bearing on one yoke with an inner pair of plate holes sized and located for bolts to be passed therethrough and threaded into the pair of threaded holes of the proximal arm of the one yoke and with a pair of outer threaded plate holes located so as to be aligned with the arms of the other yoke, and a pair of threaded dismounting bolts of a length more than sufficient to be threaded into said plate outer holes with the plate placed against the proximal trunnion bearing and into engagement with the other yoke arms, whereby the apparatus need be mounted to only one side of a universal joint in dismounting a trunnion bearing from the other joint side by threading the dismounting bolts into the plate against the other yoke arms until the trunnion bearing on the one yoke arm distal the plate has been urged at least partially therefrom.

4. The apparatus of claim 3 wherein said plate has a plurality of inner pairs of plate holes located for bolts to be passed therethrough and threaded into pairs of threaded holes of the arms of the yokes of other universal joints whose pair of threaded holes are of different spacings.

5. The apparatus of claim 3 or 4 wherein said plate has a plurality of pairs of outer threaded plate holes located so as to be aligned with the other yoke arms of other universal joints having different yoke arm sizes.

* * * * *